Oct. 8, 1935. A. S. ALEXANDER 2,016,763
REAR VIEW MIRROR
Filed March 8, 1934
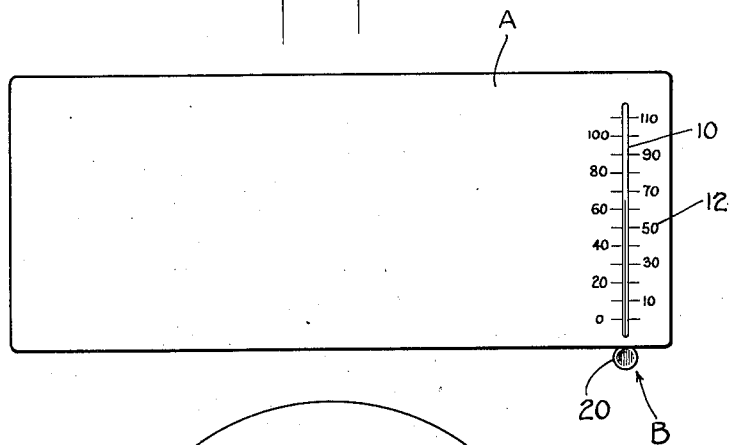
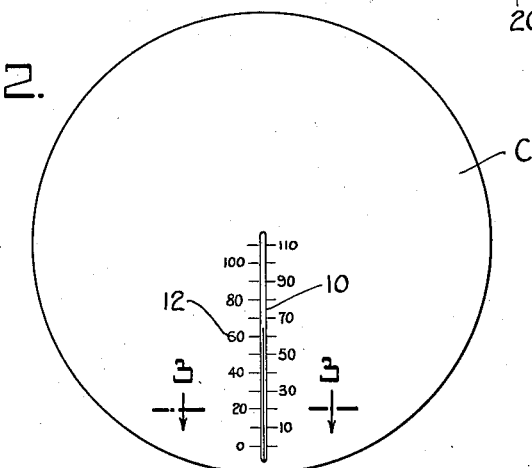
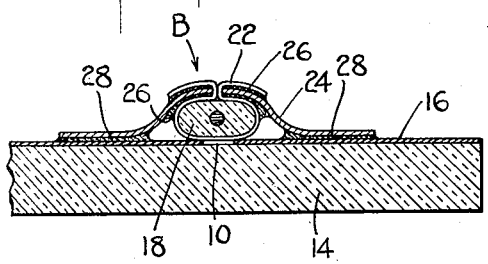
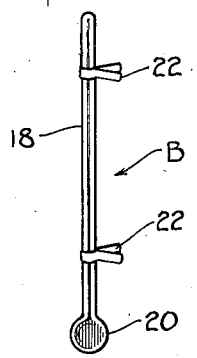
INVENTOR
Arthur S. Alexander
BY
ATTORNEY Patented Oct. 8, 1935

2,016,763

UNITED STATES PATENT OFFICE 2,016,763

REAR VIEW MIRROR

Arthur S. Alexander, New York, N. Y.

Application March 8, 1934, Serial No. 714,602

1 Claim. (Cl. 88—94)

This invention relates to automobile mirrors and particularly to the association with such a mirror of means to indicate to a person using the mirror, the temperature of the surrounding air.

Among the objects of the invention are the provision of temperature indicating means so associated with a mirror that the field of view afforded by the mirror will be substantially continuous, so as not to hamper the driver's view of road conditions, while at the same time he will be apprised of the surrounding temperature conditions without being compelled to shift his gaze from the mirror.

For the attainment of these objects and such other objects as may hereinafter appear or be pointed out I have shown several embodiments of my invention in the drawing, wherein:

Figure 1 is a view of one form of mirror showing my invention applied thereto;

Figure 2 is a similar view of a circular type of mirror showing my invention applied thereto;

Figure 3 is a section on line 3—3 of Figure 2, on a greatly enlarged scale, looking in the direction of the arrows; and Figure 4 is a perspective view of a thermometer such as is suitable for the use contemplated by my invention.

In driving automobiles, and other vehicles, it is often desirable for the driver to know what the temperature conditions are, so as to enable him, for example, to fully appreciate the conditions under which his motor is operating, or to apprise him of the temperature within his vehicle, or for other purposes. Where a separate temperature indicating means is used, it is frequently inconvenient for the driver to shift his gaze, which is divided between watching the road ahead of the machine and watching his rear view mirror by which he is apprised of conditions to the rear of the machine, to such temperature indicating means. Such inconvenience may be avoided by combining the temperature indicating means with the rear view mirror and my invention is disclosed in connection with such specific application.

Referring to Figure 1, I there show one conventional type of rear view mirror A having a thermometer B associated therewith. The thermometer is located in back of the silvered portion of the mirror, but visibility for its column is provided for by removing the silver backing of the mirror as indicated at 10 to expose the column and to provide graduations to indicate the height thereof, and by further removing silver as indicated at 12, to provide numerical indicia to be used in conjunction with the graduations to obtain temperature readings. It will be observed that the graduations merge into the clear area covering the column.

In Figure 2 I show a mirror of the circular type, C, having a thermometer B applied to the lower central portion thereof, the manner of application being similar to that indicated in Figure 1, that is, the silvering of the mirror is removed so as to render visible the column of a thermometer mounted in back thereof, and so as to provide graduations.

In Figure 3 and 4 I have indicated the details of the mounting of the thermometer. 14 indicates the glass of the mirror and 16 indicates the silver on its back. While no special showing has been made of this, it will be understood that a protective coating may be, and usually is, associated with the silver, and when the silver coating is referred to, it is to be understood as including such coating, if one is used. 10 indicates the break in the silvering of the mirror which is provided so that the column of the thermometer may be visible from the front of the mirror. The thermometer, indicated in general by B, is shown in perspective in Figure 4 and comprises a column 18 and a bulb 20. Within the bulb and the column is located the thermal fluid, as customary, to indicate temperature by its height. The thermometer column is shown as provided with a pair of clips 22 of any suitable material, such as metal, for instance, whereby it may be fastened to a backing 24. For additional security the column may also be cemented, as indicated at 26, to the backing 24, which backing will, in turn, be cemented, as at 28, to the silvered back of the mirror or to the protective coating applied thereover. The bulb 20 of the thermometer is shown in Figures 1 and 2 as located beneath the miror so as to be freely exposed to the air adjacent the mirror. However, for certain purposes it might also be located otherwise, for instance behind the mirror. In the latter event it would be desirable to have the bulb of flattened form so as to more readily accommodate it between the backing and the mirror. Similarly the column 18 of the thermometer may be made of flattened form as shown in Figure 3 so that it will be more readily accommodated between the mirror and the backing.

In the showings of both Figures 1 and 2, it will be observed that the areas of the mirrors which have been eliminated are so restricted in extent that they do not interfere substantially with the field of vision provided by the mirror, so that said field includes the area in which the thermometer is located, and it may therefore be truly said that by such embodiments of my invention the driver is simultaneously apprised of road conditions and of temperature conditions.

While I have described and illustrated several embodiments of my invention to indicate the application of my invention, it will be obvious that the same may be embodied in many other forms and put to many other uses, as will be obvious to those skilled in the art, without departing from the spirit thereof as defined in the appended claim.

Having thus described my invention and illustrated its use, what I claim as new and desire to secure by Letters Patent is:

A rear view miror for automotive vehicles comprising glass in sheet form, and a reflecting coating applied to the rear surface of the glass, said reflecting coating being continuous except in areas thereof, in which said glass is left uncoated, one of said areas being continuous and of such configuration that it is adapted to render visible the column of a thermometer positioned on the silvered side of the mirror and to provide graduations to indicate the height of said column, and other portions being removed to provide indicia whereby the height of said column may be translated into temperature readings.

ARTHUR S. ALEXANDER.